US012455869B1

(12) United States Patent
Talukdar et al.

(10) Patent No.: US 12,455,869 B1

(45) Date of Patent: Oct. 28, 2025

(54) AUTO UPGRADE MECHANISM BASED ON DETECTED SYMPTOMS

(71) Applicant: Dell Products L.P., Round Rock, TX (US)

(72) Inventors: Rohit Talukdar, Bengalure (IN); Shiv Kumar Agarwal, Bangalore (IN); Amit Kumar, Bangalore (IN); Rahul Kumar Yadav, Jaunpur (IN); Rekha Mokshendra Shankaramma, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/646,891

(22) Filed: Apr. 26, 2024

(51) Int. Cl.

| | |
|---|---|
| ***G06F 16/23*** | (2019.01) |
| ***G06F 8/65*** | (2018.01) |
| ***G06F 8/71*** | (2018.01) |
| ***G06F 11/00*** | (2006.01) |

(52) U.S. Cl.
CPC ................ *G06F 16/23* (2019.01); *G06F 8/65* (2013.01); *G06F 8/71* (2013.01); *G06F 11/008* (2013.01)

(58) Field of Classification Search
CPC ... G06F 16/23; G06F 8/65; G06F 8/71; G06F 11/008
See application file for complete search history.

(56) References Cited

U.S. PATENT DOCUMENTS

2016/0291959 A1* 10/2016 Searle .................. H04L 41/082
2016/0294605 A1* 10/2016 Searle .................. H04L 41/069
2016/0294614 A1* 10/2016 Searle .................... H04L 67/34

* cited by examiner

*Primary Examiner* — Maher N Algibhah

(74) *Attorney, Agent, or Firm* — Chamberlain, Hrdlicka, White, Williams & Aughtry; Aly Z. Dossa

(57) ABSTRACT

A method for managing health of a client includes: sending a request to infer availability of a version of an application; in response to the request, receiving: a dataset associated with the version of the application, a fixed issue previously experienced by a second client, in which the issue is fixed using the version of the application, a symptom associated with the fixed issue, information specifying a second version of the application currently being used by the second client, and a stability score; obtaining an upgrade score for the version of the application; making a first determination that an auto-upgrade option is not selected by a user; initiating displaying of at least the upgrade score and a second dataset to the user; making a second determination that an upgrade is not initiated by the user; and updating a symptoms database by decreasing the severity score of the issue.

20 Claims, 6 Drawing Sheets

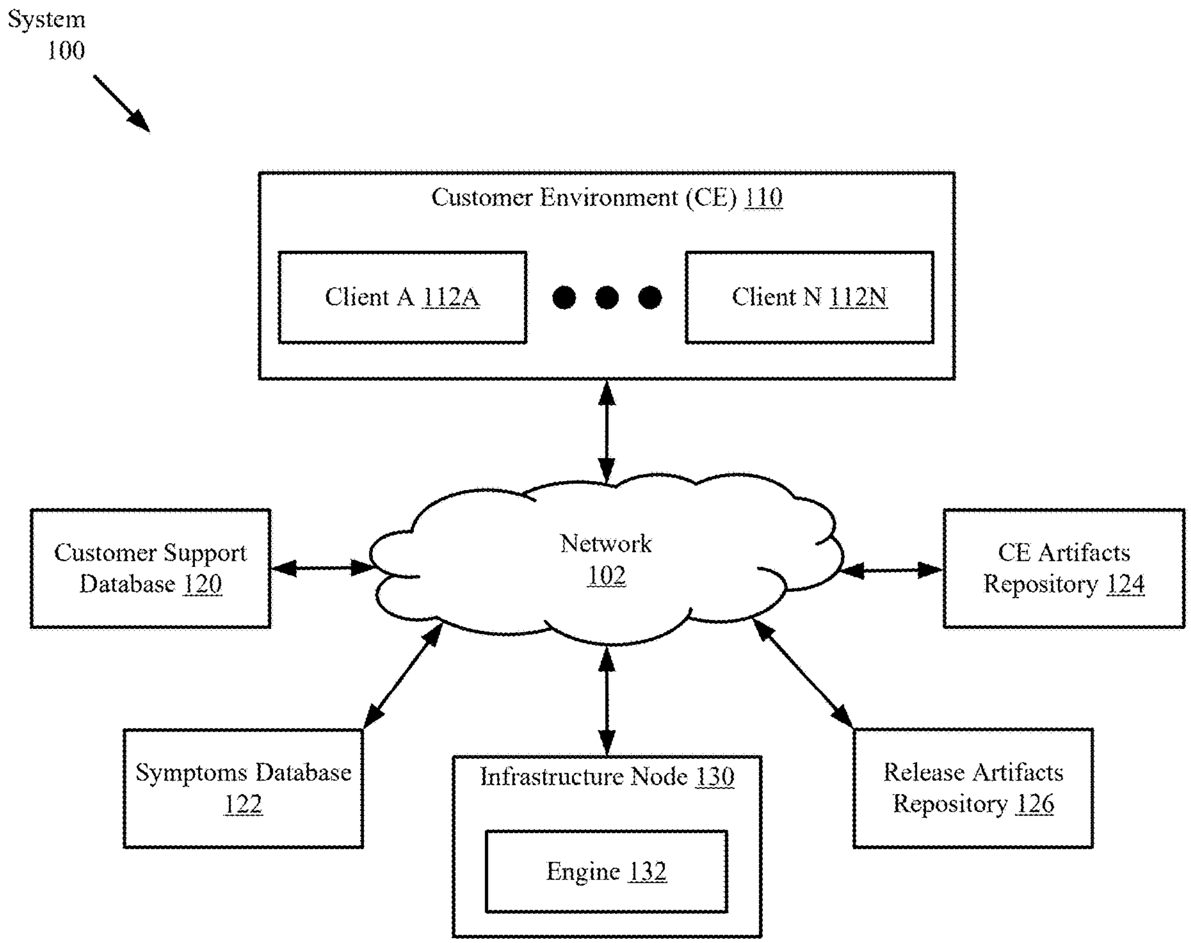
FIG. 1.1

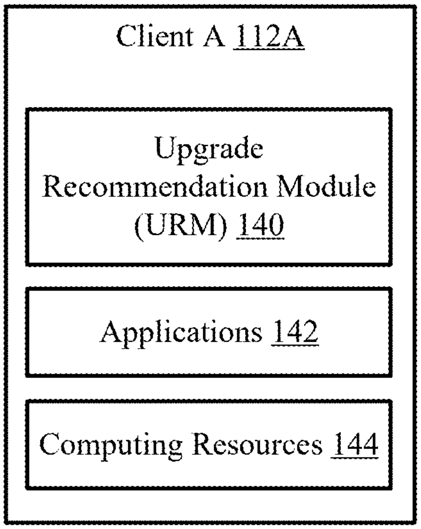
FIG. 1.2

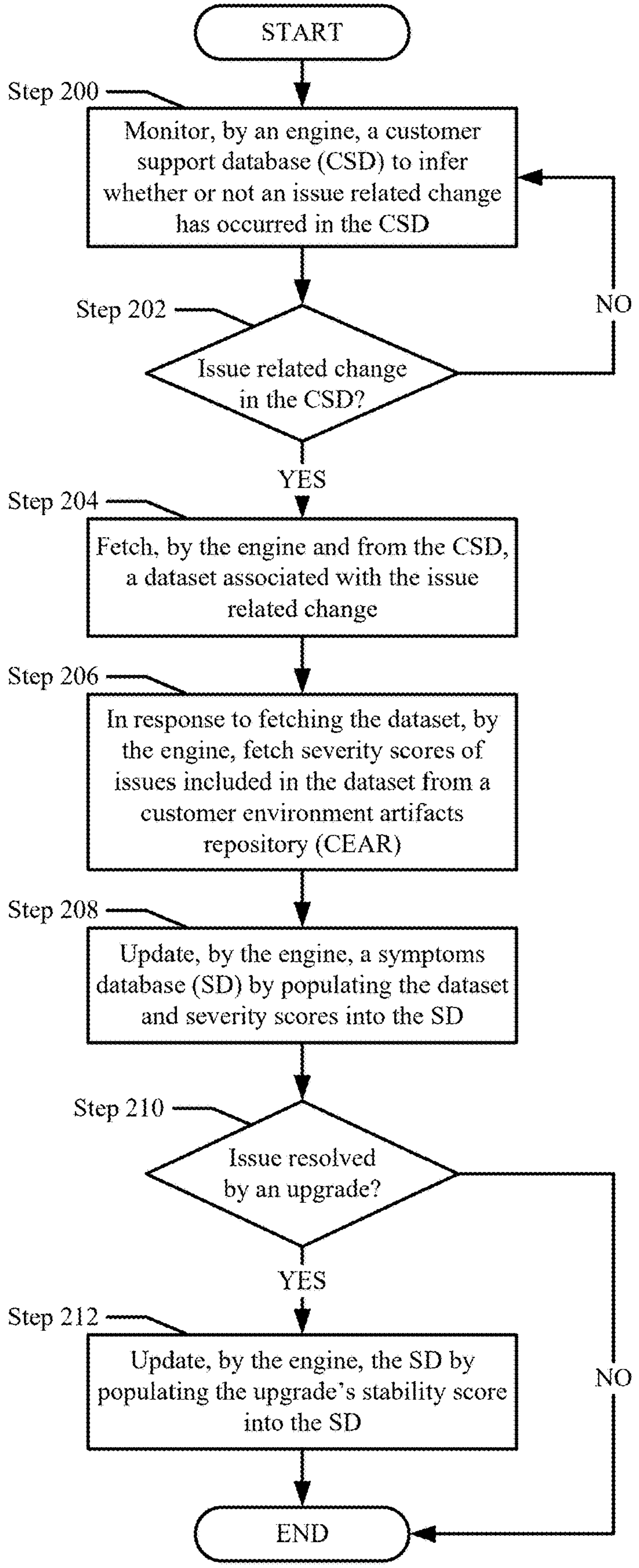
FIG. 2.1

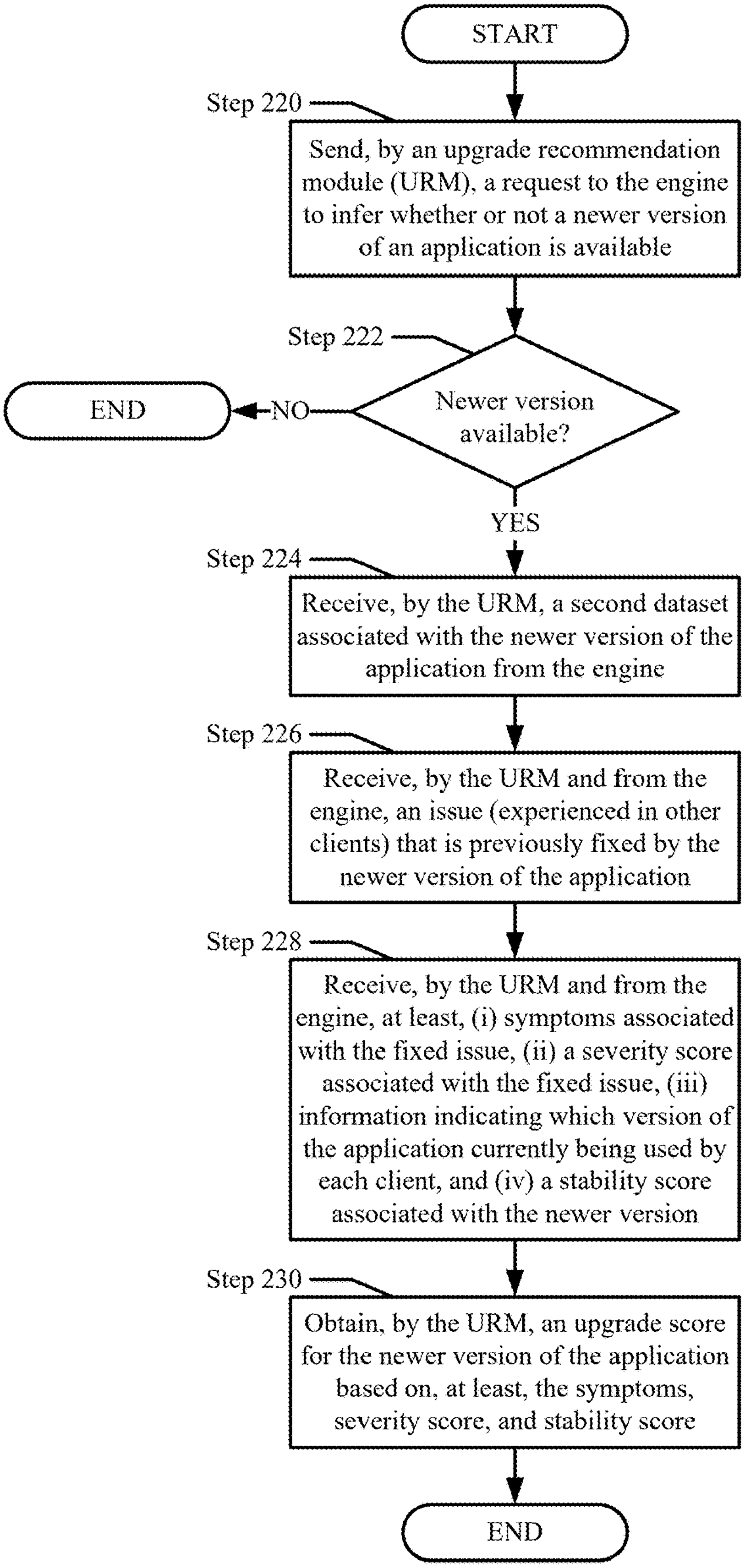
FIG. 2.2

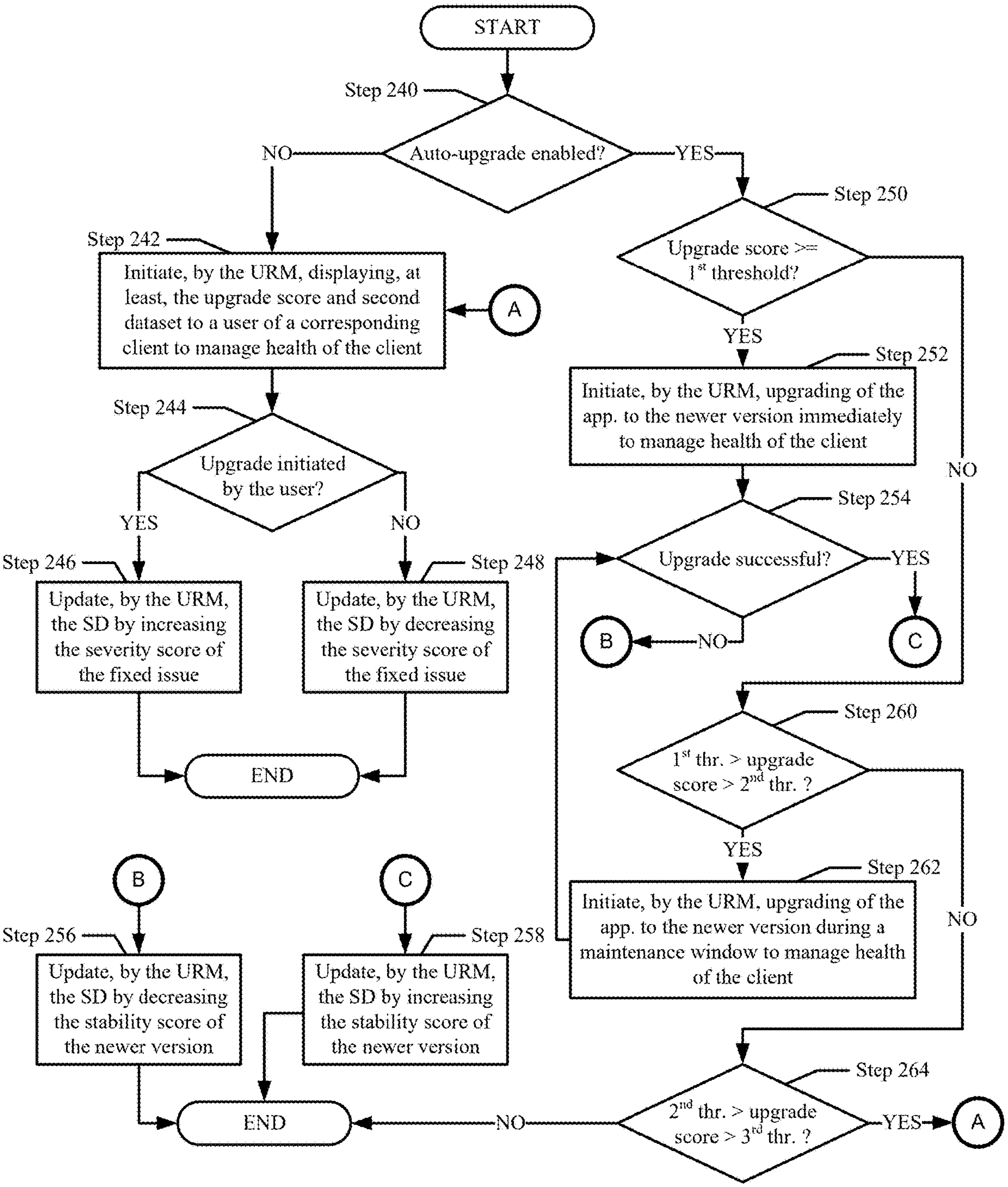
FIG. 2.3

AUTO UPGRADE MECHANISM BASED ON DETECTED SYMPTOMS

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system including a customer environment, a customer support database, a symptoms database, a customer environment artifacts repository, a release artifacts repository, and an infrastructure node in accordance with one or more embodiments of the invention.

FIG. 1.2 shows a diagram of a client in accordance with one or more embodiments of the invention.

FIG. 2.1 shows a flowchart of a method for updating a symptoms database in accordance with one or more embodiments of the invention.

FIG. 2.2 shows a flowchart of a method for obtaining an upgrade score in accordance with one or more embodiments of the invention.

FIG. 2.3 shows a flowchart of a method for updating an application and a symptoms database in accordance with one or more embodiments of the invention.

DETAILED DESCRIPTION

Figure 3:
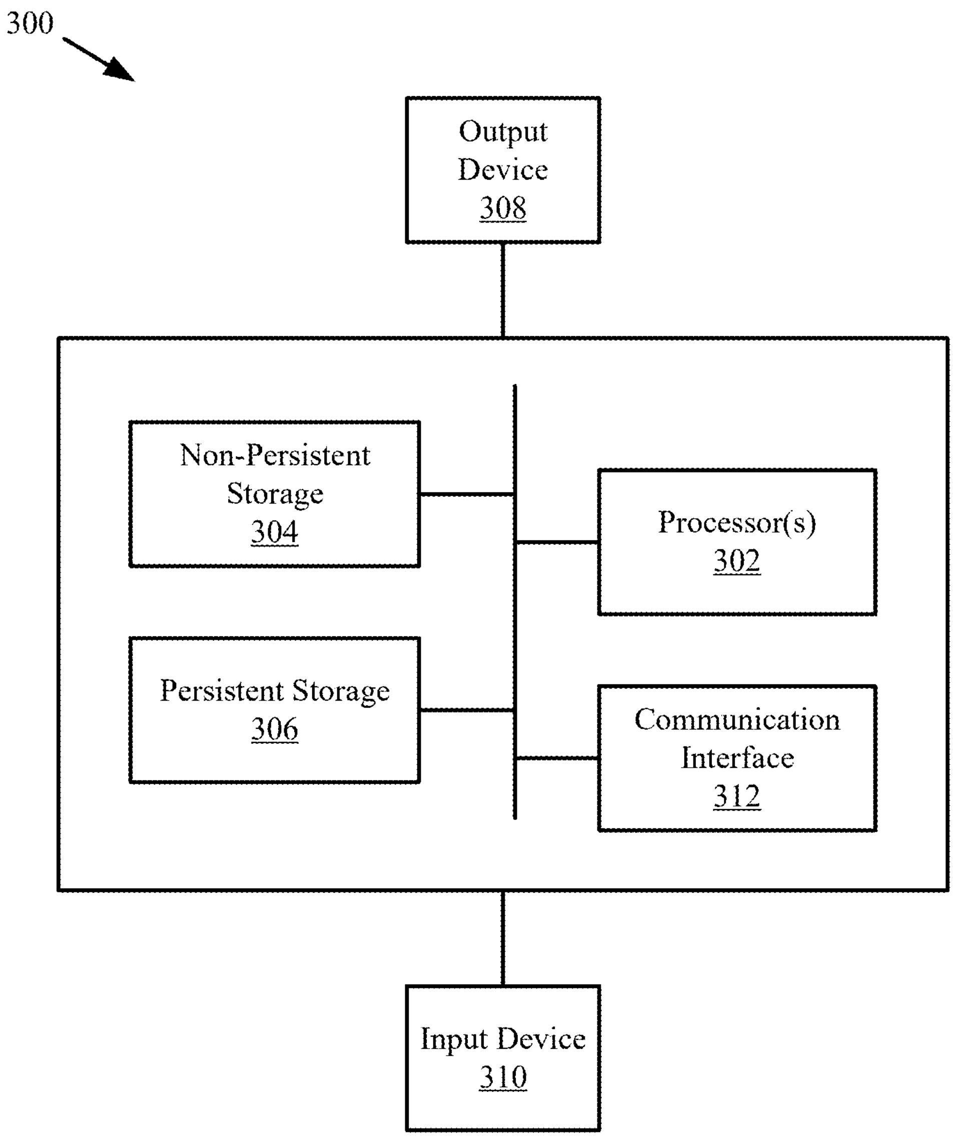
FIG. 3 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase “operatively connected” may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, consistent upgrading of applications on a client (e.g., a computing device) is crucial to maintain efficient and functional customer environments. However, the decision to upgrade to a newer version of an application requires considering various different factors such as, for example, the stability of the newer version of the application, the security issues reported for the newer version of the application, symptoms of these issues, etc. Many customers/users do not upgrade consistently as it is difficult for the customers to decide when an upgrade is needed. This may lead to multiple issues for applications executing on a customer environment, potentially even leading to security issues (e.g., being vulnerable for malicious attacks). Current approaches do not provide any guidance for customers on when upgrades are needed, which upgrades are applicable to their needs, and/or how to upgrade an application (executing on a client) to a newer version without affecting production workloads (e.g., reading data from a table, writing data to the table, etc.) being executed on the client. Further, these approaches do not offer dynamic monitoring of the symptoms of issues experienced on a given customer environment, which may be useful to maintain the functionality of applications executing on the customer environment.

For at least the reasons discussed above, a fundamentally different approach/framework is needed (e.g., a framework that at least manages application upgrades on clients and maintains their health while providing guidance to those clients’ customers).

Embodiments of the invention relate to systems and methods for managing health of a client and automatically upgrading applications executing on the client based on, at least, detected symptoms of issues. As a result of the processes discussed below, one or more embodiments of the invention advantageously ensure that: (i) the likelihood of success of an upgrade is taken into account before implementing the upgrade on a client (or before upgrading a corresponding application); (ii) security issues seen on a customer environment (that includes the client and other clients) are considered before implementing the upgrade on a client (or before upgrading a corresponding application); (iii) the application is upgraded to a version that has shown success in fixing issues reported by other clients in the customer environment; (iv) an upgrade metric is provided to customers so that they may decide if the upgrade is needed or not; (v) customer feedback is considered by an upgrade recommendation module (e.g., while obtaining an upgrade score associated with a version of an application); and/or (vi) an auto-upgrade preference of a customer is considered before automatically executing a corresponding application upgrade.

The following describes various embodiments disclosed herein.

FIG. 1.1 shows a diagram of a system (100) in accordance with one or more embodiments of the invention. The system (100) includes a network (102), a customer environment (CE) (110) containing multiple clients (112A, 112N), a customer support database (120), a symptoms database (122), a CE artifacts repository (124), a release artifacts repository (126), and an infrastructure node (130) containing an engine (132). The system (100) may include additional, fewer, and/or other components without departing from the scope of the invention. Each of the components in the system may be operatively connected via any combination of wireless and/or wired connections. Each of the aforementioned components of the system (100) is discussed below.

In one or more embodiments, the network (102) is a network that performs the functionality of allowing communication between components of the system (100) described throughout this application. As used herein, a network (e.g., 102) may refer to an entire network or any portion thereof (e.g., a logical portion of the devices within a topology of devices). A network may include a data center network, wide area network, local area network, wireless network, cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1.1, the network (102) may include any number of network devices (not shown) within any components (e.g., 110, 120, 122, 124, 126, 130, 132, etc.) of the system (100), as well as devices external to or between such components of the system (100). A network device may include any other components without departing from the scope of the invention. Examples of a network device include, but are not limited to, a network switch, router, multilayer switch, fiber channel device, an InfiniBand® device, etc. A network device is not limited to the aforementioned specific examples.

The network (102) may host any number of devices within any components of the system (100), as well as devices external to or between such components of the system (100). The network (102) provides the operative connectivity between the clients (112A, 112N) in the CE (110), the customer support database (120), the symptoms database (122), the CE artifacts repository (124), the release artifacts repository (126), and the infrastructure node (130). Each of the aforementioned system components connected by the network (102) will be described in detail below.

In one or more embodiments, the customer environment (CE) (110) contains, at least, multiple clients (112A, 112N) which are implemented as computing devices. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device it causes the computing device to perform the functionality of a client of the clients (112A, 112N) as described throughout this application. Additional information on the components of each client (112A, 112N) can be found, for example, in FIG. 1.2.

In one or more embodiments, a client of the clients (112A, 112N) is implemented as a logical device. The logical device may utilize the computing resources of any number of computing devices and thereby provide the functionality of the client as described throughout this application.

In one or more embodiments, the customer support database (120) refers to a repository for all customer issues and corresponding symptoms reported across all clients (112A, 112N) in the CE (110). Customer issues may be reported to a technical support system (not shown) and stored in the customer support database (120). Customer issues can be reported (by a corresponding client) at any time, such as whenever an issue is encountered or symptoms of an issue are detected. Customer issues may also be reported manually by a user/customer when a newer version of an application is released and applied to a corresponding client. As used herein, an issue refers to any problems or failures associated with the functionality or performance of the applications (142, FIG. 1.2) on all clients (112A, 112N).

In one or more embodiments, the symptoms database (122) refers to a database populated with information about the symptoms of issues being experienced by the clients (112A, 112N) in the CE (110). Symptoms may include any interruptions or delays associated with the intended functionality of the applications (142, FIG. 1.2). The symptoms database (122) includes multiple entries that are populated in real-time (on the order of milliseconds or less) to reflect all symptoms of issues on the CE (110). Each entry in the symptoms database (122) may include information with respect to the most recent release of an application, the associated issues with the most recent release, the associated symptoms of the most recent release, the severity score of the impact of the issues addressed in the most recent release, the next upgrade release that may solve the issues being experienced by the applications (142, FIG. 1.2) and therefore ameliorate the associated symptoms, and the stability of the upgrade. The stability of the upgrade refers to the likelihood of success of the application (142, FIG. 1.2) to be upgraded. Additional information on the functionality and population process of the symptoms database (122) may be found, for example, in FIG. 2.1.

In one or more embodiments, the CE artifacts repository (124) refers to a list of all CE artifacts. CE artifacts for the clients (112A, 112N) executing on the CE (110) may include, but are not limited to, journal logs, component logs, event logs, etc. The logs may include information on any transfers of data, any messages between components, detected issues, information on hardware and software components, etc. Information stored on these logs may be used to identify the severity of symptoms experienced by the clients (112A, 112N). The levels of the severity of symptoms can be CRITICAL, HIGH, MEDIUM, or LOW. The severity of symptoms is based on a business impact severity rating set by the customer in the CE (110). Additional information on the implementation of the information stored in the CE artifacts repository (124) may be found, for example, in FIG. 2.1.

In one or more embodiments, the release artifacts repository (126) refers to a repository of all released versions of applications. The release artifacts repository (126) may include information related to, but is not limited to, releases, updates, patches, service packs, etc.

In one or more embodiments, the infrastructure node (130) contains, at least, an engine (132). The infrastructure node (130) is operatively connected to the CE (110) via the network (102). The engine (132) includes the functionality to monitor and maintain the customer support database (120) and the symptoms database (122). The information included in these databases is utilized by an upgrade recommendation module (URM) (e.g., 140, FIG. 1.2). More information on the functionality of the engine may be found, for example, in FIG. 2.1.

One of ordinary skill will appreciate that the infrastructure node (130) may perform other functionalities without departing from the scope of the embodiments disclosed herein. The infrastructure node (130) may be implemented using hardware, software, or any combination thereof. Separately, the engine (132) may be implemented using hardware, software, or any combination thereof.

Turning now to FIG. 1.2, FIG. 1.2 shows a diagram of a client (e.g., Client A (112A)) in accordance with one or more embodiments of the invention. Client A (112A) may include the URM (140), a plurality of applications (142), and computing resources (144). Client A (112A) may include additional, fewer, and/or different components without departing from the scope of the invention. Each of the aforementioned components of Client A (112A) is discussed below.

In one or more embodiments, the URM (140) includes the functionality to support Client A (112A) in the process of upgrading the applications (142). The URM (140) assists in determining which upgrades are available, which upgrades are essential, which upgrades best fit a user's needs, etc. The URM (140) is capable of automatically upgrading an application of the applications (142) to a newer version if it is deemed critical to do so, based on one or more factors such as an upgrade score.

The upgrade score is a numerical value with multiple thresholds that assists the URM (140) in measuring the urgency to upgrade an application to a newer version. This helps a user of Client A (112A) to ensure that Client A (112A) not only have the most efficient/stable version of an application of the applications (142), but also the URM (140) is prioritizing the upgrades with the highest upgrade scores for that application. Additional information on the functionality of the URM (140) can be found, for example, in FIGS. 2.2-2.3.

In one or more embodiments, the applications (142) may refer to at least one application that may exist on Client A (112A) and may perform a variety of functionalities for Client A (112A). Functionalities of the applications (142) may include, but not limited to, performing one or more tasks for Client A (112A) such as data generation or processing, managing data (e.g., reading data, writing data, collecting data, etc.), etc.

In one or more embodiments, the computing resources (144) may refer to hardware and/or software elements/components of Client A (112A) that may be available or unavailable to manage workloads. The computing resources (144) may include, but are not limited to, resources such as storage/memory resources (e.g., Flash memory, virtualized storage, etc.), processing resources (e.g., a central processing unit (CPU), a graphics processing unit (GPU), etc.), networking resources (e.g., a network adapter, a network interface card, etc.), virtualization resources (e.g., a virtual server, a container, a VM, a virtual storage pool, etc.), etc. The computing resources (144) available to Client A (112A) (and/or other clients in the system (e.g., 100, FIG. 1.1)) may be dependent on the amount of services placed on the applications (142) at any given time.

Turning now to FIG. 2.1, FIG. 2.1 shows a flowchart of a method for updating a symptoms database (SD) in accordance with one or more embodiments of the invention. The method may be performed by, for example, the engine (e.g., 132, FIG. 1.1). Other components of the system illustrated in FIG. 1.1 may perform all, or a portion, of the method of FIG. 2.1 without departing from the scope of the invention.

While FIG. 2.1 is illustrated as a series of steps, any of the steps may be omitted, performed in a different order, include additional steps, and/or perform any or all of the steps in a parallel and/or partially overlapping manner without departing from the scope of the invention.

In Step 200, the engine monitors a CSD (e.g., 120, FIG. 1.1) to infer whether or not an issue related change has occurred. The CSD is a repository of all reported customer issues, so if a client (e.g., 112A, FIG. 1.1) deployed to a CE (e.g., 110, FIG. 1.1) reports an issue, the issue will be detected by the engine.

In Step 202, a determination is made about whether or not an issue related change has occurred in the CSD. If an issue related change has occurred in the CSD, the method proceeds to Step 204; if an issue related change has not occurred in the CSD, the method returns to Step 200.

In Step 204, based on the output of Step 202, the engine fetches a dataset associated with the issue related change from the CSD. In one or more embodiments, the dataset may include, but is not limited to, the issues reported in the issue related change and the symptoms experienced by the client due to the issue. For newer releases of applications (executing on the client), the symptoms associated with the issues may be populated by an administrator (who is related to the upgrade).

In Step 206, in response to fetching the dataset from the CSD, the engine fetches severity scores of the issues included in the dataset. The severity scores are fetched from a customer environment artifacts repository (CEAR) (e.g., 124, FIG. 1.1), and are based on a business impact severity rating set by users/customers executing on the CE. A higher business impact severity rating, and therefore higher severity scores, indicates that the issue and symptoms are causing significant disruptions to the functionality of the application on the client, or potentially affect the client's security.

In Step 208, the engine updates an SD by populating the dataset and severity scores fetched in Steps 204 and 206, respectively. Each entry in the SD includes information on of an application, the associated issues with the most recent release, the associated symptoms of the most recent release, the severity score of the impact of the issues addressed in the most recent release, the next upgrade release that may solve the issues being experienced by the applications and therefore ameliorate the associated symptoms, and the stability of the upgrade. The upgrade stability of an application is dependent on previous instances of upgrade attempts, and takes into consideration the number of successful and failed upgrades of applications. The upgrade stability is calculated by taking the difference between the number of successful upgrades and the number of failed upgrades and dividing the difference by the total number of upgrades in order to generate a numerical value. The value is then multiplied by 10. If there is no record of previous successful upgrades, then the upgrade stability value in the SD is set to zero.

In Step 210, a determination is made about whether or not the issue detected in Step 202 is resolvable by an upgrade to the application. If the issue can be resolved by an upgrade, the method proceeds to Step 212; if the issue cannot be resolved by an upgrade, the method ends.

In Step 212, based on the output of Step 210, the SD is updated by the engine to include the stability score of the upgrade identified in Step 210.

In one or more embodiments, the method may end following Step 212.

Turning now to FIG. 2.2, FIG. 2.2 shows a flowchart of a method for obtaining an upgrade score in accordance with one or more embodiments of the invention. The method may be performed by, for example, the URM (e.g., 140, FIG. 1.2). Other components of the system illustrated in FIG. 1.1 may perform all, or a portion, of the method of FIG. 2.2 without departing from the scope of the invention.

While FIG. 2.2 is illustrated as a series of steps, any of the steps may be omitted, performed in a different order, include additional steps, and/or perform any or all of the steps in a parallel and/or partially overlapping manner without departing from the scope of the invention.

In Step 220, a request is sent to the engine from the URM. The URM infers about whether or not a newer version of an application is available by sending the request.

In Step 222, a determination is made about whether or not there is a newer version of an application available. If a newer version is available, the method proceeds to Step 224; if a newer version is not available, the method ends.

In Step 224, the URM receives a second dataset associated with the newer version of the application from the engine.

In Step 226, the URM receives an issue from the engine. The issue fixed by the newer version of the application determined in Step 222 is an issue experienced by other clients on the customer system.

In Step 228, the URM receives information from the engine including: at least, symptoms associated with the fixed issue, a severity score associated with the fixed issue, information indicating which version of the application currently being used by each client, and a stability score associated with the newer version of the application. Some if not all of the information obtained by the URM in this step may come from the SD.

In Step 230, the URM obtains an upgrade score for the newer version of the application. The upgrade score is based on, at least, the symptoms, severity score, and stability score. Additional information may be obtained from the CEAR in order to determine which symptoms are fixed with the upgrade. In order to calculate the upgrade score, the following steps are performed:

$$\text{Upgrade score}=\max(\text{weight(detected symptoms)}, \text{weight(stability)})$$

$$\text{Weight(detected symptoms)}=(\text{severity}\times\text{weight})$$

$$\text{Weight(stability)}=(\text{stability score}\times\text{weight})$$

Based on the numerical values of the upgrade score calculated above, the upgrade scores are divided into three categories. Specific symptoms that potentially have a higher impact on the functionality and performance of the application may be weighted higher in the calculation of the upgrade score. The weight of an issue may be critical, high, medium, or low. For an upgrade score above 90, the URM determines that the upgrade is CRITICAL and the application must be upgraded immediately. For an upgrade score between 70 and 90, the need to upgrade is determined to be HIGH and the URM recommends to upgrade the application within a window of time where maintenance will be performed. For an upgrade score between 40 and 70, the need to upgrade the application is determined to be MEDIUM and the URM recommends to upgrade if the customer wants. For any upgrade scores below 40, the need to upgrade the application is deemed LOW and the URM will recommend to skip the upgrade. For additional detail on the implementation of the upgrade score by the URM, refer to FIG. 2.3 below. In one or more embodiments, the method may end following Step 230.

Start of Example

The following is an example of an upgrade score calculation as described in Step 230. In this example, if a release has one critical issue with a severity of 10, one medium issue with a severity of 8, and an upgrade stability of 10, the upgrade score is calculated as below:

$$\text{Critical score weight}=10*10=100$$

In this example, the weight of a critical issue is 10 and the severity of the single critical issue is 10, leading to a critical score weight of 100.

$$\text{Medium issue weight}=8*8=64$$

In this example, the weight of a medium issue is 8 and the severity of the single medium issue is 8, leading to a medium issue weight of 64.

$$\text{Stability weight}=(10*5)=50$$

In this example, the weight of the stability score is 5 and the upgrade is of stability 10, leading to a stability weight of 50.

$$\text{Upgrade score}=\max(100,64,50)=100\text{(Upgrade now)}.$$

In this example, the critical score weight is 100, the medium issue weight is 64, and the stability weight is 50, leading to a maximum upgrade score. Based on the weight and severity of the issues, the score determined in Step 230 of FIG. 2.2 would be CRITICAL.

End of Example

Turning now to FIG. 2.3, FIG. 2.3 shows a flowchart of a method for updating the application and the symptoms database in accordance with one or more embodiments of the invention. The method may be performed by, for example, the URM. Other components of the system illustrated in FIG. 1.1 may perform all, or a portion, of the method of FIG. 2.3 without departing from the scope of the invention.

While FIG. 2.3 is illustrated as a series of steps, any of the steps may be omitted, performed in a different order, include additional steps, and/or perform any or all of the steps in a parallel and/or partially overlapping manner without departing from the scope of the invention.

In Step 240, a determination is made by the URM about whether or not the user/customer has enabled auto-upgrade. If auto-upgrade is not enabled, the method proceeds to Step 242; if auto-upgrade is enabled, the method proceeds to Step 250.

In Step 242, based on the output of Step 240, the URM initiates displaying of at least the upgrade score and the second dataset associated with the newer version of the application (received in Step 224 of FIG. 2.2). The second dataset contains at least a feature enhancement provided by the version of the application, a security patch to be applied to a previous version of the application, and a size of the dataset that will allow the user to decide whether or not he/she would like to upgrade to the new version.

In Step 244, a determination is made about whether or not the upgrade (recommended by the URM to the user in Step 242) has been initiated by the user. If the upgrade is initiated by the user, the method proceeds to Step 246; if the upgrade is not initiated by the user, the method proceeds to Step 248.

In Step 246, based on the determination made in Step 244, the severity score of the fixed issue is increased by the URM in the SD. The increase of the severity score allows the SD to accurately represent the intentions of the user in terms of how they manage upgrades in the future, and over time, will allow for customer-initiated upgrades to become automatic. In one or more embodiments, the method may end following Step 246.

In Step 248, based on the determination made in Step 244, the severity score of the fixed issue is decreased by the URM in the SD. The increase of the score allows the SD to accurately reflect the intentions of the user in terms of how they plan to manage upgrades in the future, and over time, will allow for the upgrade scores of customer-rejected upgrade recommendations to decrease, and therefore, not be recommended to the user anymore. In one or more embodiments, the method may end following Step 248.

In Step 250, based on the output of Step 240, a determination is made about whether or not the upgrade score is greater than or equal to a first threshold. As discussed above in reference to FIG. 2.2, this refers to an upgrade score that is greater than or equal to 90 and is therefore determined to be CRITICAL. If the upgrade score is greater than or equal to 90, the method proceeds to Step 252; if the upgrade score is less than 90, the method proceeds to Step 260.

In Step 252, based on the determination made in Step 250 (e.g., the need to upgrade is CRITICAL), the URM initiates the upgrading to the newest version of the application immediately in order to manage the health of the client.

In Step 254, a determination is made about whether or not the upgrade initiated in Step 252 was successful. If the upgrade was successful, the method proceeds to Step 258; if the upgrade was unsuccessful, the method proceeds to Step 256.

In Step 256, based on the determination made in Step 254, the stability score of the fixed issue is decreased by the URM in the SD. The decrease of the stability score allows the SD to accurately reflect the intentions of the user in terms of how they plan to manage upgrades in the future, and over time, will allow for the upgrade scores of customer-rejected upgrade recommendations to decrease, and therefore, not be recommended to the user anymore. In one or more embodiments, the method may end following Step 256.

In Step 258, based on the determination made in Step 254, the stability score of the fixed issue is increased by the URM in the SD. The increase of the stability score allows the SD to accurately represent the intentions of the user in terms of how they plan to manage upgrades in the future, and over time, will allow for customer-initiated upgrades to become automatic. In one or more embodiments, the method may end following Step 258.

In Step 260, a determination is made about whether the upgrade score is between the first threshold and a second threshold. As discussed above in reference to FIG. 2.2, this refers to an upgrade score that is between 70 and 90 and therefore the need to upgrade is determined to be HIGH. If the upgrade score is within this range, the method proceeds to Step 262; if the upgrade score is not within this range, the method proceeds to Step 264.

In Step 262, based on the determination made in Step 260, the URM initiates upgrading of the application to the newer version of the application during a maintenance window in order to manage the health of the client.

In Step 264, a determination is made about whether the upgrade score is between the second threshold and a third threshold. As discussed above in reference to FIG. 2.2, this refers to an upgrade score that is between 40 and 70 and therefore the need to upgrade is determined to be MEDIUM. If the upgrade score is within this range, the method proceeds to Step 242; if the upgrade score is not within this range, the method ends.

As discussed above, embodiments of the invention may be implemented using computing devices. Turning now to FIG. 3, FIG. 3 shows a diagram of a computing device in accordance with one or more embodiments of the invention. The computer (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) (302) may be one or more cores or micro-cores of a processor. The computer (300) may also include one or more input devices (310), such as a touchscreen, keyboard, mouse, microphone, touchpad, electronic pen, or any other type of input device. Further, the communication interface (312) may include an integrated circuit for connecting the computer (300) to a network (not shown) (e.g., a local area network (LAN), a wide area network (WAN) such as the Internet, mobile network, or any other type of network) and/or to another device, such as another computing device.

In one embodiment of the invention, the computer (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many diverse types of computing devices exist, and the aforementioned input and output device(s) may take other forms.

One or more embodiments of the invention may be implemented using instructions executed by one or more processors of the system including clients, multiple databases and repositories, an infrastructure node, and an engine. Further, such instructions may correspond to computer readable instructions that are stored on one or more non-transitory computer readable mediums.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing health of a client, the method comprising:
- sending a request from a user recommendation model (URM) of the client to infer availability of a version of an application executing on the client, wherein the request comprises at least an identifier of the application and wherein the request is received by an engine of an infrastructure node that monitors databases providing information on all versions of the application;
- in response to the request, receiving:
  - a dataset associated with the version of the application;
  - a fixed issue that is previously experienced by a second client, wherein the fixed issue is fixed using the version of the application; and
  - a symptom associated with the fixed issue, a severity score associated with the fixed issue, information specifying a second version of the application currently being used by the second client, and a stability score associated with the version of the application;
- obtaining an upgrade score for the version of the application based on at least the symptom, the severity score, and the stability score;
- making a first determination that an auto-upgrade option is not selected by a user of the client;
- initiating, based on the first determination, displaying of at least the upgrade score and a second dataset to the user by the URM via the client;
- in response to the initiating, making a second determination that an upgrade to the version of the application is not initiated by the user; and
- updating, based on the second determination, a symptoms database of the databases by decreasing the severity score associated with the fixed issue to accurately reflect intentions of the user in terms of future upgrades and to make future similar upgrades not be recommended to the user.

2. The method of claim 1, wherein the dataset specifies at least a feature enhancement provided by the version of the application, a security patch to be applied to a previous version of the application, and a size of the dataset.

3. The method of claim 1, wherein the fixed issue is a partial file system corruption detected on the client.

4. The method of claim 1, wherein the symptom is an improper shutdown of an operating system of the client.

5. The method of claim 1, further comprising:
- prior to obtaining the upgrade score:
  - assigning a predetermined weight to each of the symptom, the stability score, and the severity score.

6. The method of claim 5, wherein the upgrade score is greater than a first threshold and indicates that the health of the client is critical.

7. The method of claim 5, wherein the upgrade score is less than a first threshold and indicates that the health of the client is not critical.

8. A method for managing health of a client, the method comprising:
- sending a request from a user recommendation model (URM) of the client to infer availability of a version of an application executing on the client, wherein the request comprises at least an identifier of the application and wherein the request is received by an engine of an infrastructure node that monitors databases providing information on all versions of the application;
- in response to the request, receiving:
  - a dataset associated with the version of the application;
  - a fixed issue that is previously experienced by a second client, wherein the fixed issue is fixed using the version of the application; and
  - a symptom associated with the fixed issue, a severity score associated with the fixed issue, information specifying a second version of the application currently being used by the second client, and a stability score associated with the version of the application;
- obtaining an upgrade score for the version of the application based on at least the symptom, the severity score, and the stability score;
- making a first determination that an auto-upgrade option is selected by a user of the client;
- making, based on the first determination, a second determination that the upgrade score is greater than or equal to a threshold making an upgrade to the version critical;
- initiating, based on the second determination, upgrading of the application to the version of the application by the URM to manage the health of the client;
- making a third determination that the upgrading of the application is successful; and
- updating, based on the third determination, a symptoms database of the databases by increasing the stability score associated with the version of the application to accurately represent intentions of the user in terms of future upgrades and to make future similar upgrades automatic.

9. The method of claim 8, wherein the dataset specifies at least a feature enhancement provided by the version of the application, a security patch to be applied to a previous version of the application, and a size of the dataset.

10. The method of claim 8, wherein the fixed issue is a partial file system corruption detected on the client.

11. The method of claim 8, wherein the symptom is an improper shutdown of an operating system of the client.

12. The method of claim 8, further comprising:
- prior to obtaining the upgrade score:
  - assigning a predetermined weight to each of the symptom, the stability score, and the severity score.

13. The method of claim 12, wherein the upgrade score indicates that the health of the client is critical.

14. The method of claim 8, wherein the version of the application is provided by a vendor.

15. A method for managing health of a client, the method comprising:
- sending a request from a user recommendation model (URM) of the client to infer availability of a version of an application executing on the client, wherein the request comprises at least an identifier of the application and wherein the request is received by an engine of an infrastructure node that monitors databases providing information on all versions of the application;

in response to the request, receiving:

a dataset associated with the version of the application;

a fixed issue that is previously experienced by a second client, wherein the fixed issue is fixed using the version of the application; and a symptom associated with the fixed issue, a severity score associated with the fixed issue, information specifying a second version of the application currently being used by the second client, and a stability score associated with the version of the application;

obtaining an upgrade score for the version of the application based on at least the symptom, the severity score, and the stability score;

making a first determination that an auto-upgrade option is selected by a user of the client;

making, based on the first determination, a second determination that the upgrade score is less than a threshold making an upgrade to the version not critical;

making, based on the second determination, a third determination that the upgrade score is greater a second threshold making the upgrade to the version a high need;

initiating, based on the third determination, upgrading of the application to the version of the application during a maintenance window by the URM to manage the health of the client;

making a fourth determination that the upgrading of the application is successful; and updating, based on the fourth determination, a symptoms database of the databases by increasing the stability score associated with the version of the application to accurately represent intentions of the user in terms of future upgrades and to make future similar upgrades automatic.

16. The method of claim 15, wherein the dataset specifies at least a feature enhancement provided by the version of the application, a security patch to be applied to a previous version of the application, and a size of the dataset.

17. The method of claim 15, wherein the fixed issue is a partial file system corruption detected on the client.

18. The method of claim 15, wherein the symptom is an improper shutdown of an operating system of the client.

19. The method of claim 15, further comprising:

prior to obtaining the upgrade score:

assigning a predetermined weight to each of the symptom, the stability score, and the severity score.

20. The method of claim 19, wherein the upgrade score indicates that the health of the client is high.

* * * * *